US012564195B2

(12) United States Patent
Jungblom

(10) Patent No.: US 12,564,195 B2
(45) Date of Patent: Mar. 3, 2026

(54) CRAB PROCESSING SYSTEMS AND METHODS

(71) Applicant: Eric Jungblom, Ferndale, WA (US)

(72) Inventor: Eric Jungblom, Ferndale, WA (US)

( * ) Notice: Subject to any disclaimer, the term of this patent is extended or adjusted under 35 U.S.C. 154(b) by 146 days.

(21) Appl. No.: 18/175,341

(22) Filed: Feb. 27, 2023

(65) Prior Publication Data

US 2023/0276815 A1 Sep. 7, 2023

Related U.S. Application Data

(60) Provisional application No. 63/268,695, filed on Feb. 28, 2022.

(51) Int. Cl.
A22C 29/02 (2006.01)
A22C 29/00 (2006.01)

(52) U.S. Cl.
CPC .......... A22C 29/024 (2013.01); A22C 29/005 (2013.01); A22C 29/027 (2013.01)

(58) Field of Classification Search
CPC .......................... A22C 29/024; A22C 29/027
USPC ................ 452/74, 78, 80, 87–89, 173, 6, 9; 248/213.2
See application file for complete search history.

(56) References Cited

U.S. PATENT DOCUMENTS

| | | | | |
|---|---|---|---|---|
| 4,802,260 A | * | 2/1989 | Fletcher ............... | A47G 21/061 452/1 |
| 4,846,076 A | * | 7/1989 | Menges, Sr. ........... | A01K 97/22 297/188.09 |
| 5,474,494 A | * | 12/1995 | Sims ...................... | A22C 25/06 452/194 |
| 5,572,934 A | * | 11/1996 | Aldridge ................ | A47B 37/00 D6/686 |
| 6,558,244 B1 | * | 5/2003 | Nedelka ................. | B26D 3/185 452/149 |
| 7,022,006 B1 | * | 4/2006 | Naglich ................ | A22C 29/024 452/102 |
| 7,467,590 B1 | * | 12/2008 | Meller .................... | A47B 37/00 297/188.09 |
| D588,879 S | * | 3/2009 | Brett .............................. | D7/698 |
| 7,547,246 B1 | | 6/2009 | Verret | |
| 9,380,796 B1 | * | 7/2016 | Quisenberry ........ | A22C 29/024 |
| 10,264,801 B1 | * | 4/2019 | Thiessen .............. | A22C 29/005 |

* cited by examiner

*Primary Examiner* — David J Parsley
(74) *Attorney, Agent, or Firm* — Michael R. Schacht; Bronte Brillantes; Schacht Law Office, Inc.

(57) ABSTRACT

A crab processor is adapted to be supported by a bucket defining a rim and an inner diameter, the crab processor comprising a main portion, a first support portion, and a second support portion. The first and second portions are attached to the main portion such that the first and second support portions define first and second portions of the main portion and a distance defined by the second portion of the main portion is less than the inner diameter of the bucket. The first and second support portions engage the rim of the bucket to support the crab processor in a desired orientation relative to the bucket.

19 Claims, 6 Drawing Sheets

CRAB PROCESSING SYSTEMS AND METHODS

RELATED APPLICATIONS

This application, U.S. patent application Ser. No. 18/175,341 filed Feb. 27, 2023, claims benefit of U.S. Provisional Application Ser. No. 63/268,695 filed Feb. 28, 2022, the contents of which are incorporated herein by reference.

TECHNICAL FIELD

The present invention relates to systems and methods for processing crabs and, in particular, to crab processing systems and methods that allow single crabs to be prepared by hand for cooking and/or consumption.

BACKGROUND

Crabs are harvested for human consumption. Prior to consumption, a crab is typically processed by "cleaning" the crab by removing and disposing of certain parts of the crab such as the shell, lungs, and the like. A crab may be cleaned before or after cooking. Cleaning of crab can be labor intensive and require substantial clean up.

The need exists for improved systems and methods for facilitating the processing of crab prior to human consumption.

SUMMARY

The present invention may be embodied as a crab processor adapted to be supported by a bucket defining a rim and an inner diameter. The crab processor comprising a main portion, a first support portion, and a second support portion. The first and second portions are attached to the main portion such that the first and second support portions define first and second portions of the main portion and a distance defined by the second portion of the main portion is less than the inner diameter of the bucket. The first and second support portions engage the rim of the bucket to support the crab processor in a desired orientation relative to the bucket.

The present invention may also be embodied as a crab processing comprising a bucket defining a rim and an inner diameter and a crab processor comprising a main portion, a first support portion, and a second support portion. The first and second portions are attached to the main portion such that the first and second support portions define first and second portions of the main portion and a distance defined by the second portion of the main portion is less than the inner diameter of the bucket. The first and second support portions engage the rim of the bucket to support the crab processor in a desired orientation relative to the bucket.

The present invention may also be embodied as a method of processing a crab comprising the following steps. A bucket defining a rim and an inner diameter is provided. A crab processor comprising a main portion, a first support portion, and a second support portion is provided. The first and second portions are attached to the main portion such that the first and second support portions define first and second portions of the main portion and a distance defined by the second portion of the main portion is less than the inner diameter of the bucket. The first and second support portions are engaged with the rim of the bucket to support the crab processor in a desired orientation relative to the bucket. The crab is arranged in a desired orientation relative to the crab processor. A force is applied to the crab split the crab to facilitate further processing of the crab.

DETAILED DESCRIPTION

Figure 1:
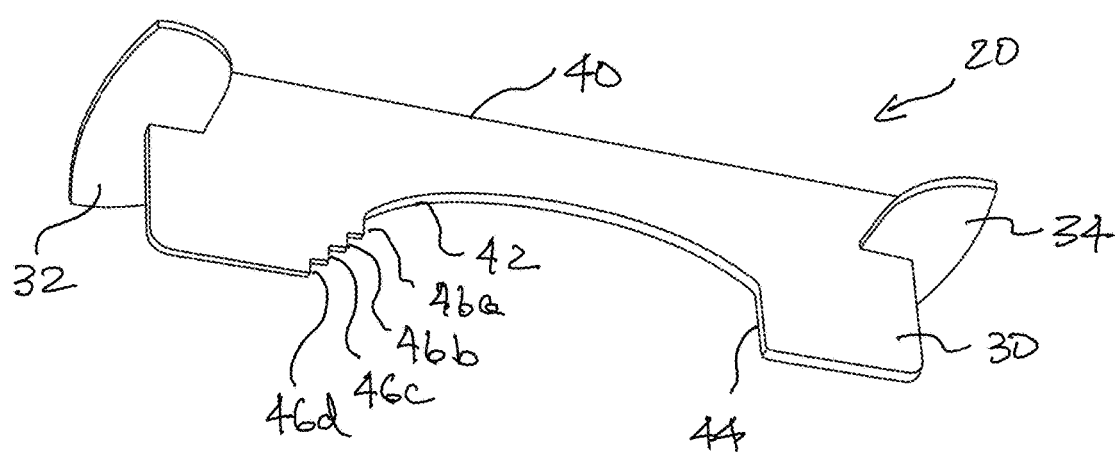
FIG. 1 is a bottom perspective view of a first example crab processor of the present invention.
Figure 2:
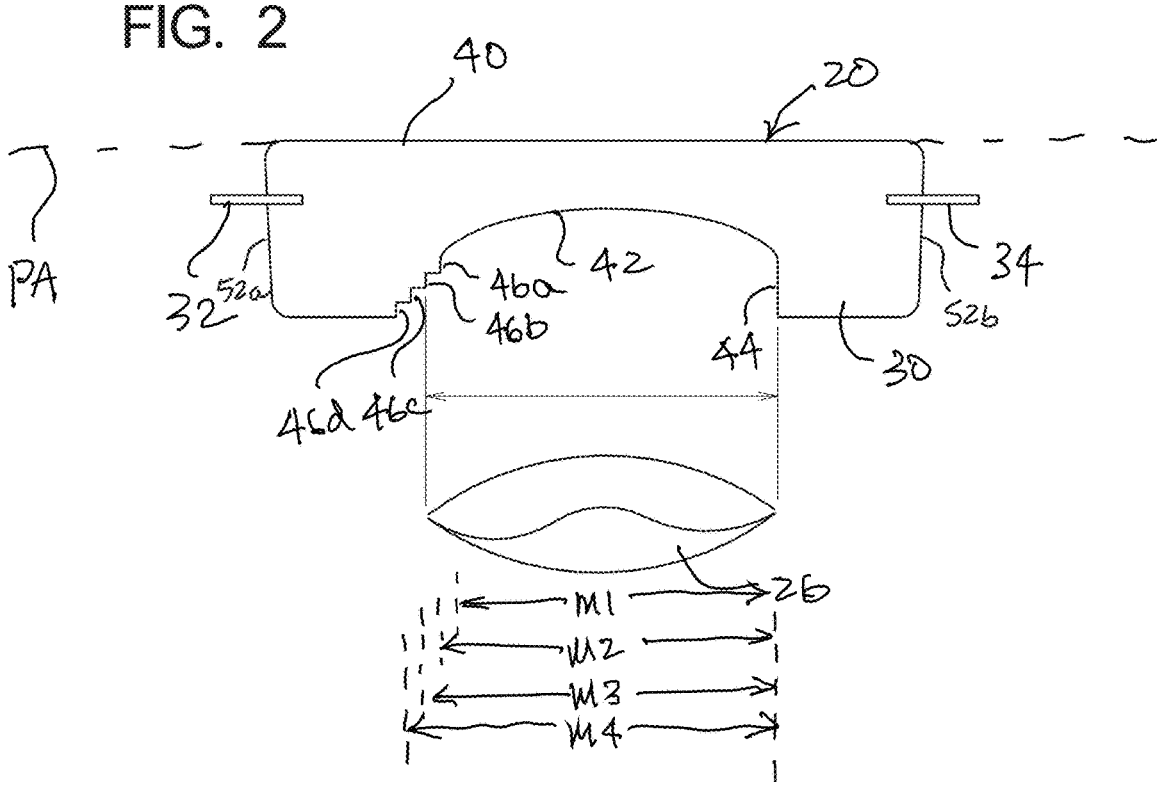
FIG. 2 is a side elevation view illustrating use of the first example crab processor being used as a measurement tool to measure a crab.

FIG. 1 of the drawing depicts a first example crab processor 20 of the present invention. The first example crab processor 20 is adapted for use with a bucket 22 as shown in FIGS. 3, 4, 5, and 7 to form a first example crab processing system 24 of the present invention. The example bucket 22 is or may be conventional and will be described herein to that extend helpful to a complete understanding of the first example crab processor 20 and first example crab processing system 24 described herein. Further, as shown in FIGS. 4-8, the first example crab processor 20, and crab processing system 24 including the first example crab processor 20, may be used by a user (not shown) as part of a method of processing a crab 26. The example bucket 22 defines an inner surface 28. FIG. 2 illustrates that the first example crab processor 20 may also be configured for use during a process of measuring the crab 26.

Referring now more specifically to FIG. 1 of the drawing, The first example crab processor 20 comprises a main portion 30 and first and second support portions 32 and 34. The example main portion 30 defines a processing edge 40 and, optionally, a measuring edge 42.

The example main portion 30 is a material of sufficient rigidity to process the crab 26 as described herein. Examples of suitable materials include aluminum, stainless steel, plastic, wood, or the like. Preferably, the material from which the example main portion 30 is made is either not susceptible to corrosion or coated with a material that inhibits corrosion. The example crab processor 20 is made of aluminum. As shown in FIG. 1, the example main portion 30 is substantially planar and defines a processing plane that is substantially coplanar with the main portion 30. A processing axis PA extends through the processing plan PP along at least a portion of the processing edge 40.

The example processing edge 40 is substantially straight, but the processing edge may take other forms suitable for processing the crab 26 as described herein.

The optional measuring edge 42 is shaped to define a reference surface 44 and one or more measuring surfaces 46. The example measuring edge 42 defines first, second, third, and fourth measuring surfaces 46a, 46b, 46c, and 46d, and predefined measurement distances M1, M2, M3, and M4 are defined between the reference surface 44 and the first, second, third, and fourth measuring surfaces 46a, 46b, 46c, and 46d, respectively. Indicia (not shown) may be formed on the main portion 30 adjacent to each of the first, second, and third measuring surfaces 46a, 46b, and 46c to communicate to the user the predefined measurement distances M1, M2, and M3. In the measuring process depicted in FIG. 2, the relevant dimension of the example crab 26 is greater than the first measurement distance M1, equal to the second measurement distance M2, and shorter than the measurement distances M3 and M4. Using the measurement edge 42, the user may determine whether the example crab 26 is of legal size for harvesting.

Figure 3:
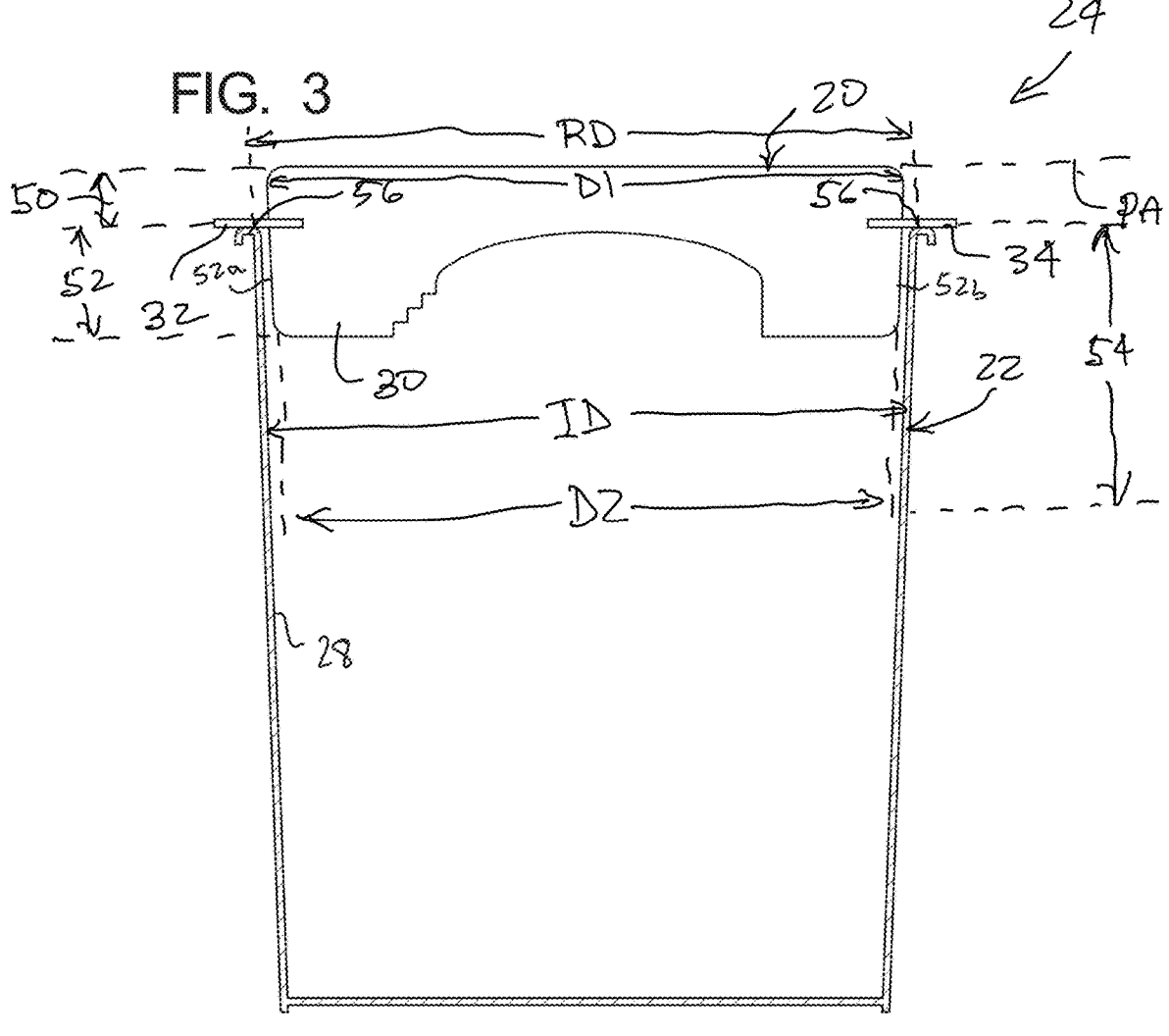
FIG. 3 is a side elevation partial section view illustrating a first example crab processing system comprising the first example crab processor and a bucket.
Figure 5:
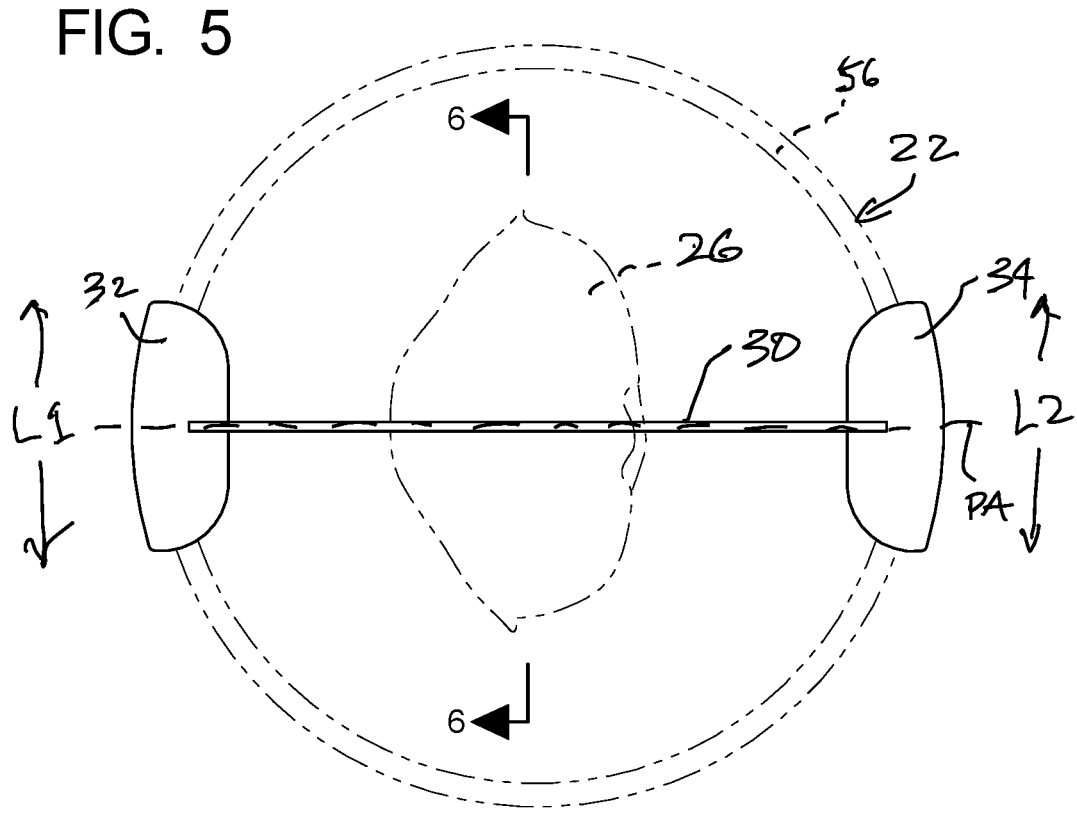
FIG. 5 is a top plan view showing alignment of the crab with a processing axis defined by the first example crab processor during the first step of the first example crab cleaning process.

The example support portions 32 and 34 are rigidly or detachably attached to the main portion 30. FIG. 3 illustrates that the support portions 32 and 34 define a first portion 50 and a second portion 52 of the main portion 30. A distance D1 defined by the first portion 52 of the main portion 30 is sized and dimensioned to allow processing of the crab 26 as defined herein. The inner surface 28 of the bucket 22 defines an inner dimension of the bucket 22. In particular, with a conventional round bucket as shown, the inner dimension of the bucket 22 is an inner diameter ID. A distance D2 defined between first and second end portions 52a and 52b of the second portion 52 is less than the inner dimension, or diameter ID, of at least an upper portion 54 the bucket 22. However, the example support portions 32 and 34 are sized and dimensioned to extend from the second portion 52 of the main portion 30 beyond opposite portions of a rim 56 of the bucket 22. A rim diameter RD is defined by a distance between the opposing portions of the rim 56. The example support portions 32 and 34 further define lateral dimensions L1 and L2 as shown in FIG. 5. As shown in FIG. 3, the support portions 32 and 34 are substantially symmetrically arranged to extend from the processing axis PA defined by the main portion 30.

When arranged relative to the bucket 22 as shown in FIGS. 3 and 5, the example second portion 52 is sized and dimensioned to extend at least partly into the interior of the bucket 22, and the example support portions 32 and 34 engage the rim 56 to support the first example crab processor 22 in a desired orientation relative to the bucket 22. Further, the example lateral dimensions L1 and L2 of the example support portions 32 and 34 stably support the main portion 30 to form the crab processing system 24 and when processing the crab 26 as described below.

Figure 4:
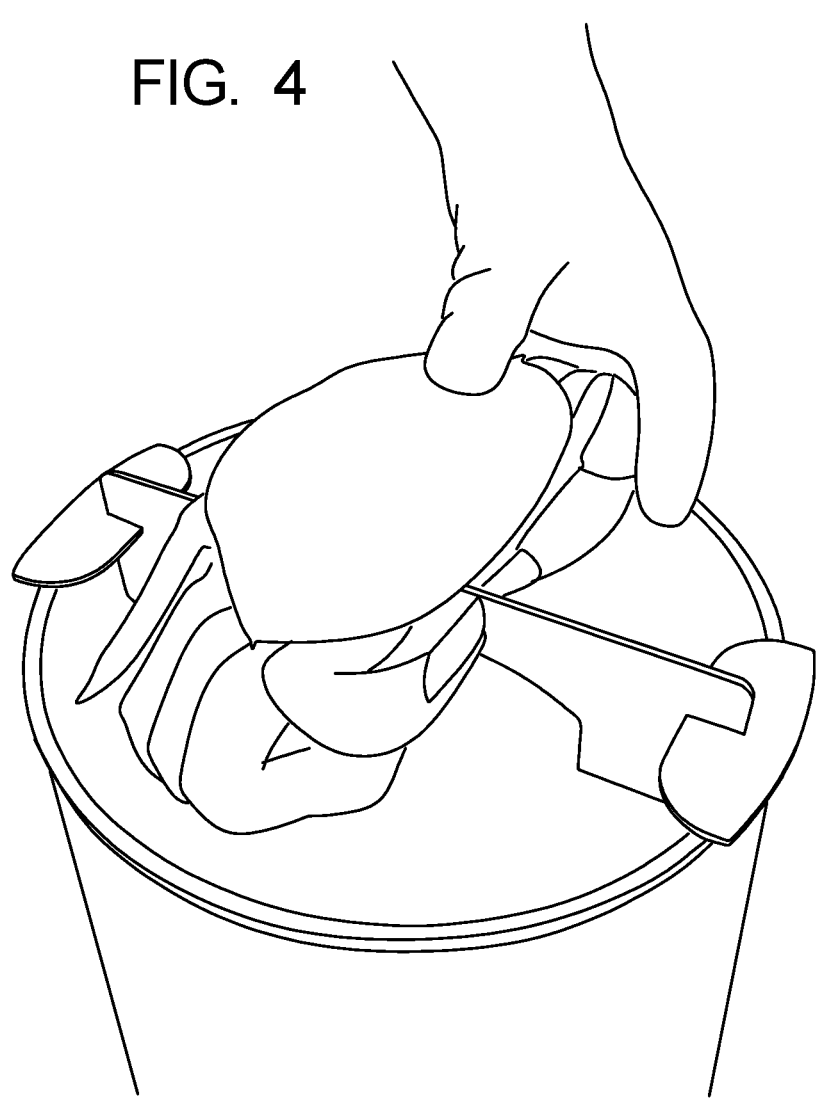
FIG. 4 is a top perspective view illustrating a first step of a first example crab cleaning method using the first example crab processing system.
Figure 6:
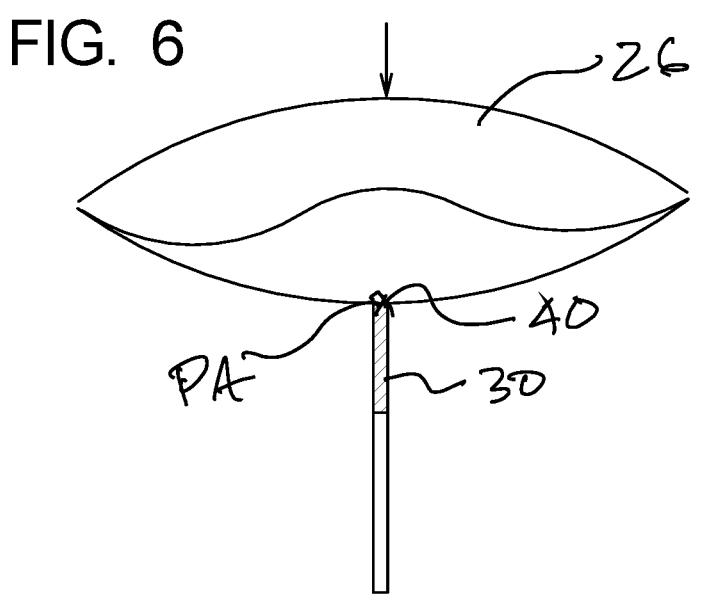
FIG. 6 is an end elevation view showing alignment of the crab with the processing axis defined by the first example crab processor prior to performing a second step of the first example crab cleaning processing method.
Figure 7:
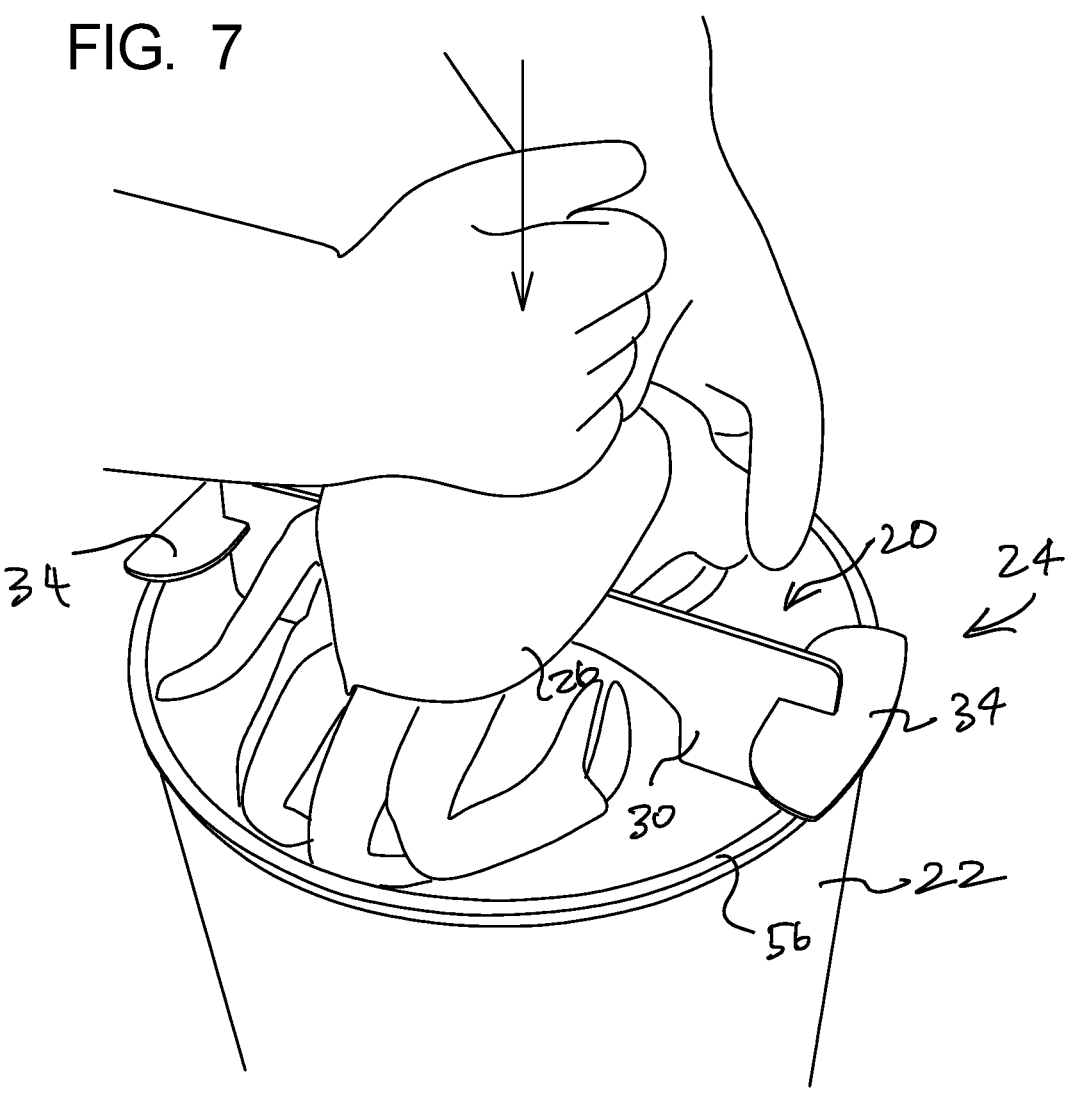
FIG. 7 is a top perspective view illustrating the second step of the first example crab cleaning method using the first example crab processing system.
Figure 8:
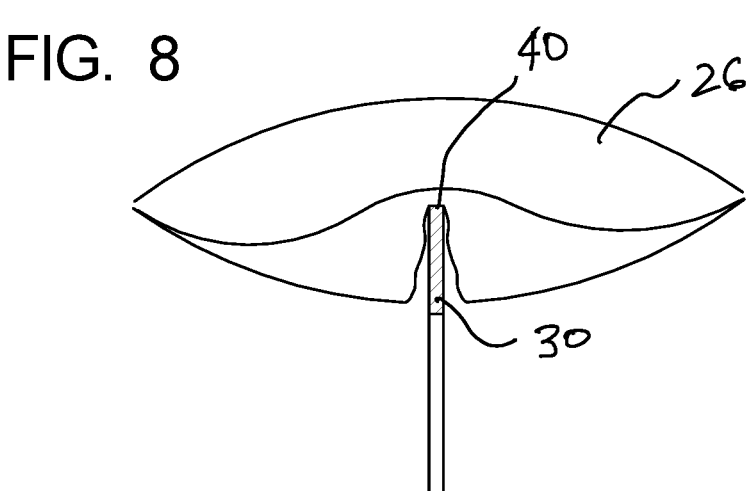
FIG. 8 is an end elevation view showing piercing of the crab after performing the second step of the first example crab cleaning processing method.
Figure 9:
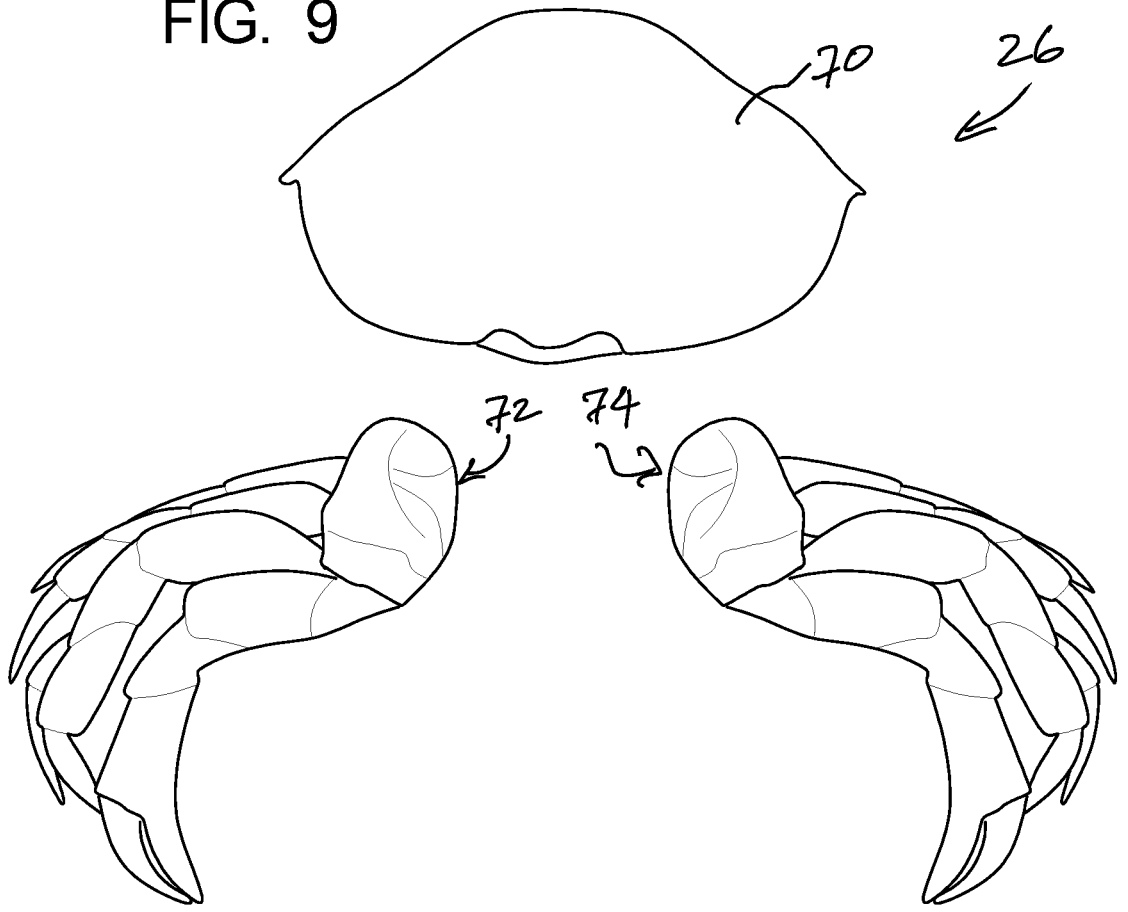
FIG. 9 is a top plan view somewhat schematically illustrating the results of a third step of the first example crab cleaning processing method.

With the crab processing system 24 formed as shown in FIGS. 3 and 4, the method of processing crabs is performed on the example crab 26 as follows. Initially, the crab 26 is arranged on the processing edge 40 substantially symmetrically relative to the processing axis PA as shown in FIG. 6. Next, as shown in FIG. 7, the user braces the crab 26 with a first hand 60 and strikes the back or shell of the crab 26 with a second hand 62. As shown in FIG. 8, the strike causes the processing edge 40 to at least partially split the crab 26. At this point, a shell 70 may be removed from the crab 26 and the body of the crab broken into first and second halves

72 and 74. The first and second halves may be cooked without the shell 70 attached, optimizing cooking space.

What is claimed is:

1. A crab processor for processing crab adapted to be supported by a bucket defining a rim, an inner surface, and an inner dimension defined by the inner surface of the bucket, the crab processor comprising:

a rigid, substantially planar main portion comprising a first portion and a second portion disposed along a processing plane, where the first portion defines a processing edge, and the second portion defines first and second end portions and a second portion distance between the first and second end portions, and the second portion distance is less than the inner dimension of the bucket;

first and second support portions integrally formed with the main portion, where the first and second support portions define a support plane, the support plane extends at an angle relative to the processing plane, the first portion of the main portion is on a first side of the support plane, and the second portion of the main portion is on a second side of the support plane; wherein during use of the crab processor, the first and second support portions are adapted to engage the rim of the bucket to support the crab processor in a desired orientation relative to the bucket; and with the crab processor supported in the desired orientation relative to the bucket, the second portion distance between the first and second end portions of the second portion of the main portion is such that the second portion of the main portion is configured to be arranged within the interior of the bucket such that the first and second end portions of the second portion of the main portion are adjacent to the inner surface of the bucket;

the first portion of the main portion extends out of the bucket such that the processing edge is accessible above the rim of the bucket; and the first and second support portions are spaced from each other such that, during use of the crab processor, portions of the crab being processed is configured to be displaced into the interior of the bucket between the first and second support portions on both sides of the processing plane.

2. A crab processor as recited in claim 1, in which at least one of the first and second support portions defines a lateral dimension that engages the bucket to stably support the main portion.

3. A crab processor as recited in claim 1, in which the processing edge is suitable for processing crab.

4. A crab processor as recited in claim 1, in which the second portion of the main portion defines a measuring edge suitable for measuring crab.

5. A crab processor as recited in claim 4, in which the measuring edge comprises a reference surface and at least one measuring surface.

6. A crab processing system comprising:

a bucket defining a rim, an inner surface and an inner dimension defined by the inner surface of the bucket; and a crab processor comprising:

a rigid, substantially planar main portion comprising a first portion and a second portion disposed along a processing plane, where the first portion defines a processing edge, and the second portion defines first and second end portions and a second portion distance between the first and second end portions, and the second portion distance is less than the inner dimension of the bucket;

first and second support portions integrally formed with the main portion, where the first and second support portions define a support plane, the support plane extends at an angle relative to the processing plane, the first portion of the main portion is on a first side of the support plane, and the second portion of the main portion is on a second side of the support plane;

wherein;

during use of the crab processor, the first and second support portions are adapted to engage the rim of the bucket to support the crab processor in a desired orientation relative to the bucket; and with the crab processor supported in the desired orientation relative to the bucket, the second portion distance between the first and second end portions of the second portion of the main portion is such that the second portion of the main portion is configured to be arranged within the interior of the bucket such that the first and second end portions of the second portion of the main portion are adjacent to the inner surface of the bucket;

the first portion of the main portion extends out of the bucket such that the processing edge is accessible above the rim of the bucket; and the first and second support portions are spaced from each other such that, during use of the crab processor, portions of the crab being processed is configured to be displaced into the interior of the bucket between the first and second support portions on both sides of the processing plane.

7. A crab processing system as recited in claim 6, in which the main portion is configured such that, when the first and second support portions engage the bucket, the second portion of the main portion is substantially arranged within the bucket.

8. A crab processing system as recited in claim 6, in which the main portion is configured such that, when the first and second support portions engage the bucket, the first portion of the main portion is substantially arranged outside of the bucket.

9. A crab processing system as recited in claim 6, in which at least one of the first and second support portions defines a lateral dimension that engages the bucket to stably support the main portion.

10. A crab processing system as recited in claim 6, in which the processing edge is suitable for processing crab.

11. A crab processing system as recited in claim 6, in which the second portion of the main portion defines a measuring edge suitable for measuring crab.

12. A crab processing system as recited in claim 11, in which the measuring edge comprises a reference surface and at least one measuring surface.

13. A method of processing a crab comprising the steps of:

providing a bucket defining a rim, an inner surface, and an inner dimension defined by the inner surface of the bucket; and providing a crab processor comprising:

a rigid, substantially planar main portion comprising a first portion and a second portion disposed along a processing plane, where the first portion defines a processing edge, and the second portion defines first and second end portions and a second portion distance between the first and second end portions, and the second portion distance is less than the inner dimension of the bucket;

first and second support portions integrally formed with the main portion, where the first and second support portions define a support plane, the support plane extends at an angle relative to the processing plane, the first portion of the main portion is on a first side of the support plane, and the second portion of the main portion is on a second side of the support plane; wherein during use of the crab processor, adapting the first and second support portions to engage with the rim of the bucket to support the crab processor in a desired orientation relative to the bucket;

supporting the crab processor in a desired orientation relative to the bucket;

arranging the second portion of the main portion within the interior of the bucket such that the second portion distance between the first and second end portions of the second portion of the main portion is such that the first and second end portions of the second portion of the main portion are adjacent to the inner surface of the bucket;

arranging the first portion of the main portion to extend out of the bucket such that the processing edge is accessible above the rim of the bucket;

spacing the first and second support portions from each other such that, during use of the crab processor, portions of the crab being processed is configured to be displaced into the interior of the bucket between the first and second support portions on both sides of the processing plane;

arranging the crab in a desired orientation relative to the crab processor; and applying a force to the crab split the crab to facilitate further processing of the crab.

14. A method as recited in claim 13, further comprising the step of configuring the main portion such that, when the first and second support portions engage the bucket, the second portion of the main portion is substantially arranged within the bucket.

15. A method as recited in claim 13, further comprising the step of configuring the main portion such that, when the first and second support portions engage the bucket, the first portion of the main portion is substantially arranged outside of the bucket.

16. A method as recited in claim 13, in which the step of providing the first and second support portions comprises the step of configuring at least one of the first and second support portions to define a lateral dimension configured to engage the bucket to stably support the main portion.

17. A method as recited in claim 13, further comprising the step of configuring the processing edge to be suitable for processing crab.

18. A method as recited in claim 13, further comprising the step of configuring the main portion such that the second portion of the main portion defines a measuring edge suitable for measuring crab.

19. A method as recited in claim 18, in which the measuring edge comprises a reference surface and at least one measuring surface.

\* \* \* \* \*